US010435607B2

United States Patent
Tanaka et al.

(10) Patent No.: US 10,435,607 B2
(45) Date of Patent: Oct. 8, 2019

(54) GRAPHITE MATERIAL AND PRODUCTION METHOD THEREOF

(71) Applicant: Panasonic Intellectual Property Management Co., Ltd., Osaka (JP)

(72) Inventors: Atsushi Tanaka, Osaka (JP); Naomi Nishiki, Kyoto (JP); Hidetoshi Kitaura, Osaka (JP); Kimiaki Nakaya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 213 days.

(21) Appl. No.: 15/458,947

(22) Filed: Mar. 14, 2017

(65) Prior Publication Data

US 2017/0275515 A1    Sep. 28, 2017

(30) Foreign Application Priority Data

Mar. 28, 2016  (JP) .................................. 2016-062987

(51) Int. Cl.
| | | |
|---|---|---|
| *C09K 5/14* | (2006.01) | |
| *C01B 32/20* | (2017.01) | |
| *C01B 32/205* | (2017.01) | |
| *B32B 5/14* | (2006.01) | |

(52) U.S. Cl.
CPC .............. *C09K 5/14* (2013.01); *B32B 5/142* (2013.01); *B32B 5/147* (2013.01); *C01B 32/20* (2017.08); *C01B 32/205* (2017.08); *B32B 2264/108* (2013.01); *B32B 2305/02* (2013.01); *B32B 2307/302* (2013.01); *C01P 2006/32* (2013.01); *C01P 2006/90* (2013.01)

(58) Field of Classification Search
CPC ........ C09K 5/14; C01B 32/20; C01P 2006/32
See application file for complete search history.

(56) References Cited

U.S. PATENT DOCUMENTS

| | | | |
|---|---|---|---|
| 4,599,193 A | 7/1986 | Murase et al. | |
| 4,915,984 A | 4/1990 | Murakami | |
| 2017/0053851 A1* | 2/2017 | Kutsumizu | ........... H01L 23/373 |
| 2017/0368795 A1* | 12/2017 | Kutsumizu | ............... B32B 9/00 |

FOREIGN PATENT DOCUMENTS

| | | |
|---|---|---|
| JP | 60-181129 | 9/1985 |
| JP | 61-275116 | 12/1986 |

* cited by examiner

*Primary Examiner* — Hai Vo
(74) *Attorney, Agent, or Firm* — Panasonic IP Management; Kevin S. Culpepper

(57) ABSTRACT

A graphite material has a flexible part and can be utilized as a heat-conveying material in a narrow space. The graphite material, includes: at least one heat-conveying part; and a flexible part. A method for producing a graphite material, includes: (i) subjecting at least one film serving as a material to a heat treatment to obtain at least one carbonaceous film; (ii) providing a monolayer or multilayer structure including the at least one carbonaceous film; and (iii) applying heat and pressure to at least one part of the monolayer or multilayer structure in an inert atmosphere.

5 Claims, 1 Drawing Sheet

GRAPHITE MATERIAL AND PRODUCTION METHOD THEREOF

TECHNICAL FIELD

The technical field relates to a graphite material, and a production method thereof. In particular, the technical field relates to a graphite material for the purpose of thermal diffusion, and a production method thereof.

BACKGROUND

As a material diffusing heat generated from electronic devices, a graphite-based thermal countermeasure has been used. With the technical advancement in performance of electronic devices, amounts of heat generation therefrom have increased. In order to deal with such increased amounts of heat generation, it is required that the graphite materials are designed to be sufficiently thicker to be capable of releasing larger amounts of heat from the devices.

In conventional arts, a method in which one piece of a thick polymer film is electrically sintered to produce a thick graphite material has been proposed (JP-A-60-181129). Furthermore, there has been a method in which multiple pieces of polymer films are layered, and the layered films are subjected to a heat/pressure treatment to produce a thick graphite material (JP-A-61-2775116).

SUMMARY

The method disclosed in JP-A-60-191129 requires a very thick polymer film since the graphite material is produced from one piece of the polymer film as mentioned above. However, only a polymer film having a thickness of up to 150 μm can currently be produced. Furthermore, when a thick polymer film is employed therein, gases present inside the polymer film are hardly released therefrom during the heat treatment, and, as a result, the resulting graphite material will exhibit inferior crystallinity and formability.

Furthermore, although a thick graphite material can be produced according to the method disclosed in JP-A-61-275116, the graphite material would not have sufficient flexibility since multiple pieces of polymer films are subjected to a heat/pressure treatment in the disclosed method. Accordingly, when the produced graphite material is placed inside electronic devices, an excessively large space able to afford a volume of the thick graphite material would be required, and therefore, it would not be able to be used in thin electronic devices.

Hence, a purpose of the disclosure is to provide a graphite material that combines superior heat-radiation properties and flexibility (bendability), and a production method thereof.

In order to achieve the above purpose, according to one aspect of the disclosure, provided is a graphite material, including: at least one heat-conveying part; and a flexible part. In some embodiments, the at least one heat-conveying part has a porosity of 1% to 30%, and the flexible part has a porosity of more than 30% to 50%.

Furthermore, according to another aspect of the disclosure, provided is a method for producing a graphite material, including: (i) subjecting at least one film serving as a material to a heat treatment to obtain at least one carbonaceous film; (ii) providing a monolayer or multilayer structure including the at least one carbonaceous film; and (iii) applying heat and pressure to at least one part of the monolayer or multilayer structure in an inert atmosphere.

By partially adjusting a pressure applied to the film during the production process, a graphite material having a flexible part can be realized. As a result, when the graphite material according to the disclosure is used in an electronic device, an increased heat-radiation area can be realized without any limitations due to the layout of components included in the electronic device. Thus, heat generation can efficiently be suppressed even in thin electronic devices.

DESCRIPTION OF EMBODIMENTS

Figure 1:
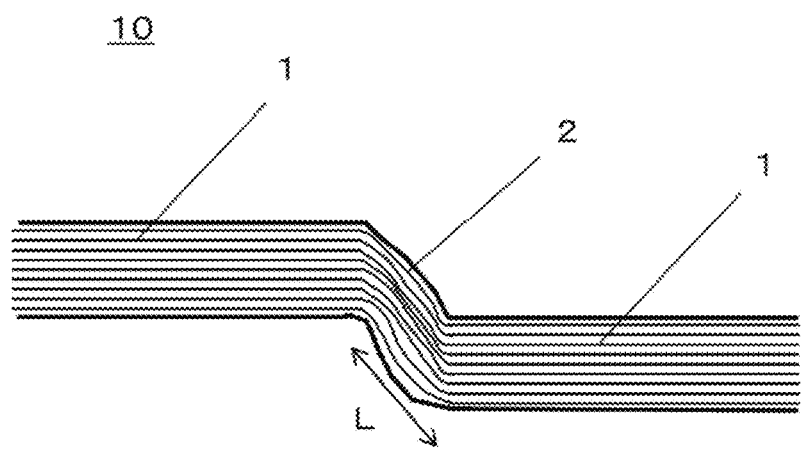
FIG. 1 is a cross-section view of a graphite material according to an embodiment.

FIG. 1 is a schematic cross-section view of a graphite material 10 according to an embodiment. The graphite material has heat-conveying parts 1 that each convey a large amount of heat, and a flexible part 2 that has a certain degree of bendability (flexibility). Each of the parts and a method for producing the graphite material will be described in detail below. In addition, the graphite material 10 may be formed in a sheet or planar shape.

<Heat-conveying Part 1>

The heat-conveying parts 1 convey and release: heat to secure heat radiation. The heat-conveying parts 1 include graphite, and have a graphite-layer structure as shown in FIG. 1. Graphite layers are aligned in such a manner that graphite basal planes are parallel to surfaces of the heat-conveying parts 1. The same shall apply to the flexible part 2. Preferably, the heat-conveying parts 1 each have a thickness of 100 μm or more. An amount of neat conveyance will be determined by a product of the heat conductivity and the thickness. Therefore, if the thicknesses of the heat-conveying parts 1 are less than 100 μm, effective heat radiation may not be realized.

On the other hand, in cases where the heat-conveying parts 1 each have a thickness of more than 500 μm, the heat-conveying parts 1 have inferior bendability (flexibility), and, consequently, it may become difficult to insert the produced graphite device into a device. Therefore, the thicknesses of the heat-conveying parts 1 are preferably 500 μm or less.

Figure 2:
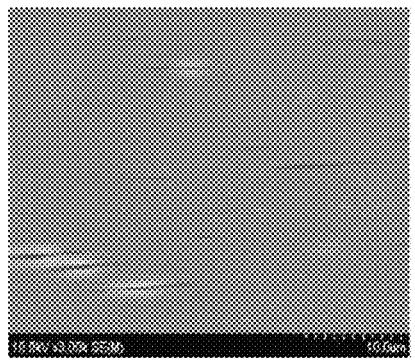
FIG. 2 is a diagram that shows a photo of an observed cross-section of a heat-conveying part of a graphite material according to an embodiment.

FIG. 2 is a scanning electron micrograph of a cross section of a heat-conveying parts 1 of the graphite material according to the embodiment. By binarising such a cross-section observation image, a porosity can be calculated. In this case, a pore refers to a space that is produced between graphite layers. If a graphite material is produced under high temperature/pressure conditions, few pores will be present therein, and the graphite material will have diamond-like properties.

Each of the heat-conveying parts 1 preferably has a porosity of 1% to 30%. If the porosity is smaller than 1%, the graphite produced therein would be monocrystalline, and the heat-conveying parts 1 may become very hard. Therefore, the resulting graphite material would be unsuitable as a thermal countermeasure that is attached on an object. On the other hand, if the porosity exceeds 30%, the degree of heat conveyance would be decreased, and therefore, the resulting graphite material may be unsuitable as a thermal countermeasure.

<Flexible Part 2>

The flexible part 2 has a certain degree of flexibility or bendability. A length L of the flexible part 2 is preferably 1 mm or more. A height of a component that the graphite material 10, serving as a thermal countermeasure component, needs to cross aver may generally be 300 μm or more. In other words, in cases where the graphite material 10 is used inside an electronic device, the graphite material 10 needs to cross over an electronic component inside the electronic device. In order for the graphite material 10 to cross over an electronic component, the length L may need to be 300 μm or more since most, of electronic components have a height of about 300 μm or more. An upper limit of the length L may be 3 mm. This is because the length L is preferably 3 mm or less in order to secure sufficient thermal conveyance.

When the length L of the flexible part 2 is smaller than 1 mm, there may be cases in which the graphite material 10 cannot tolerate a difference in heights of electronic components or the like, and thus, is possibly cracked.

Preferably, a porosity of the flexible part 2 is more than 30%, and is 50% or less. If the porosity is 30% or less, then, the flexible part 2 may not have sufficient bendability (flexibility), and thus, cracks may be caused in the flexible part 2. On the other hand, if the porosity exceeds 50%, then, heat conveyance properties may significantly be deteriorated, and thus, conveyance of heat may be impaired.

The terms "flexible", "flexibility", "bendable" and "bendability" used herein means that the flexible part 2 is bendable at an angle of 45°. Also, these terms mean that the flexible part 2 is bendable at least once. This is because if is only required that the graphite material 10 may foe bent once, in order to place it in various devices. However, in cases in which the flexible part 2 has flexibility that makes it possible to bend the flexible part 2 two or three times, the graphite material 10 would be used again and again in various devices. Therefore, a graphite material 10 having such flexibility over the flexible part 10 is preferable.

<Method for Producing a Graphite Material 10>

A graphite material 10 according to the disclosure can be produced based on (i) a carbonaceous film-producing step, (ii) a preparatory step for molding; and (iii) a molding step.

In the carbonaceous film-producing step (i.e., step (i)), at least one film serving as a material is subjected to a heat treatment at 400° C. to 2000° C. to obtain at least one carbonaceous film. A rate of temperature increase therefor may be from 1 to 5° C./minute.

In the preparatory step for molding (i.e., step (ii)), a monolayer or multilayer structure including the at least one carbonaceous film obtained in the carbonaceous film-producing step is provided. Multiple films may be subjected to the heat treatment to produce multiple carbonaceous films in Step (i), and the produced multiple carbonaceous films may be layered to provide the multilayer structure in Step (ii).

In the molding step (i.e., step (iii)), heat and pressure are applied to at least one part of the monolayer or multilayer structure obtained in Step (ii) inside a molding die in an inert atmosphere. The monolayer or multilayer structure say partially be molded by a pressure of 5 MPs to 20 MPa while being maintained at 2200° C. or higher.

In step (i), the heat treatment temperature for producing carbonaceous films: say ranges from 400° C. to 2000° C. The heat treatment may be carried out at a temperature higher than 2000° C. However, in cases in which the at least one film is subjected to the heat treatment within the above temperature range, and, the resulting at least one carbonaceous film is molded by hot pressing into isotropic graphite including a curved surface processed into a part of the structure, followed, the resulting graphite material 10 will have excellent quality.

The term "carbonaceous film(s) refers to film(s) made of glass-like and amorphous carbon.

After the at least one: carbonaceous film is produced in Step (i), the at least one carbonaceous film may be provided as the monolayer structure, or multiple carbonaceous films produced in Step (i) say be layered to provide the multilayer structure in Step (ii). Then, in Step (iii), the monolayer or multilayer structure may be subjected to a molding process that is a substantial press-bonding step under heating conditions after a temperature-increasing step, or may be subjected directly to the molding process, to progress graphitization of carbonaceous materials in the monolayer or multilayer structure. In this way, a graphite material 10 in which graphite crystals are oriented parallel to surfaces of the resulting graphite films is produced.

In Step (iii), i.e. the molding step, at least one part of the monolayer or multilayer structure may be molded at a pressure of 5 MPa or higher while being maintained at 2200° C. or higher. In that case, the at least one part will serve as a heat-conveying part 1 in the resulting graphite material 10. If the temperature is lower than 2200° C., a crystalline structure required for heat-conveying part(s) 1 may not be formed, and an amount of heat conveyance by the resulting graphite material 10 may be decreased.

As for the pressure, if the applied pressure is smaller than 5 MPa, thin carbonaceous films may not be adhered tightly to each other, and, consequently, it may be impossible to obtain heat-conveying parts 1 having desirable thicknesses.

If the applied pressure is larger than 20 MPa, the porosity may be smaller than 1%, and, in that case, the conveying parts 1 become very hard. By applying a pressure of 5 MPa to 20 MPa only to at least one part of the monolayer or multilayer structure (i.e., to at least one part thereof that will serve as a heat-conveying part 1), a graphite material having a heat-conveying part(s) 1 and a flexible part 2 can be obtained. In addition, any pressure may not be applied to a part of the monolayer or multilayer structure (i.e. a part that will serve as a flexible part 2). However, both of the parts that will serve as a heat-conveying part (s) 1 and a flexible part 2 may be subjected to the same heat treatment. Therefore, in that case, the heat-conveying part(s) 1 and the flexible part 2 may be produced from the same polymer film (s). The heat-conveying part (s) 1 and the flexible part 2 may be continuous with each other, and graphite basal planes in heat-conveying part (s) 1 and the flexible part 2 may be continuous with each other.

As for the above-mentioned rate of temperature increase, if the rate is smaller than 1° C./minute, the porosity of the flexible part 2 may be 30% or less. On the other hand, if the rate is larger than 5° C./minute, the porosity of the flexible part 2 may be larger than 50%. In addition, the heat-conveying part(s) 1 would be provided without causing any problems, at the above-mentioned range of the rate of temperature increase.

If the porosity of the flexible part 2 is 30% or less, the flexible part 2 may lose sufficient flexibility, and therefore, cracks may be caused therein, and the heat-radiation properties may be deteriorated.

On the other hand, the porosity of the flexible part 2 is larger than 50%, then, the heat conductivity of the flexible part 2 may be lowered, and therefore, the heat-radiation properties would be deteriorated.

Furthermore, the flexible part 2 is preferably placed between heat-conveying parts 1. As shown in FIG. 1, a flexible part 2 is preferably placed between multiple heat-conveying parts 1. In cases in which heat-conveying parts 1 are located in at least two directions around the flexible part 2, the flexible part 2 would swell in a stable manner, and the heat treatment can stably be carried out. Therefore, such arrangement of the heat-conveying parts 1 and the flexible part 2 is preferable.

In addition, oxygen, hydrogen, etc. have been removed from the graphite material 10 through the heat treatment, and the graphite material 10 consists essentially of carbon (i.e. approximately 100% of carbon). However, the graphite material 10 can include inevitable elements.

<Films Usable as Materials>

Possible films usable as materials in present disclosure (hereinafter, the film(s) may be referred to simply as "material film(s)") may be polymer films. For example, polyimides (PI), polyamides (PA), polyoxadiazoles (POD), polybenzothiaxoles (PBT), poilybensobisthiazoles (PBBT), polybenzoxazoles (PBO), polybenzobisoxazoles (PBBQ), polyparaphenylenevinylenes (PPV), polyphenylene benzoimidazoles (PBI), polyphenylene benzobisimidasoles (PPBI), and polythiazoles (PT) can be mentioned.

A heat-resistant aromatic polymer film including at least one polymer selected from these materials is preferably used. This is because the electrical conductivity and the heat conductivity of the resulting graphite material 10 will be higher in cases where such a polymer film is used as a material. The above types of polymer films may be produced by known techniques.

Among the above polymers, polyimides are particularly preferable since polyimides having various structures and properties can be obtained by selecting various types of material monomers.

Moreover, a material film having a thickness of 75 μm or less is preferably used. In cases in which a material film having a thickness larger than 75 μm is used, the crystallinity may be distorted depending on timing of gas generation, and this results in deterioration of the heat conductivity. Therefore, the resulting material may be unsuitable as a heat-conveying material.

Furthermore, since the above polymer film is subjected to the heat treatment, oxygen, hydrogen, and the like are removed from graphite generated in the neat-conveying part (s) 1 through the sintering process. In the graphite generated in the heat-conveying part(s) 1 (or in the produced graphite material 10), a content of oxygen is preferably 3.1 at % or less, and/or a content of nitrogen is preferably 4.1 at % or less.

Additionally, a gap between layers each having a six-membered carbon ring structure in the graphite present in the heat-conveying part(s) 1 is preferably from 3.3 angstroms to 3.73 angstroms. Graphite obtained by subjecting the polymer film to the heat treatment would have a layer structure originated from the polymer. A half-value width of 2θ/θ of the X ray diffraction peaks of the (002) plane of the graphite in the heat-conveying part(s) 1 is preferably 0.5 or smaller, i.e., the produced graphite is preferably highly crystalline.

In addition, graphite forming the flexible part 2 may have the same physical properties described above.

Hereinafter, embodiments will more specifically be described based on examples. However, it should be noted that the examples below do not limit embodiments of the disclosure.

EXAMPLES 1-3

20 pieces of polyimide films (Kapton films manufactured by DU PONT-TORAY CO., LTD) each having a thickness of 25 82 m were layered as material films that were graphitized through the product ion process. Graphite materials were prepared, based on conditions shown in Table 1 with regard to welding pressures, rates of temperature increase, porosities of each of the parts, and lengths of flexible parts 2. Results of evaluation of heat-radiation properties of the produced graphite materials are also shown in Table 1. Variations in the porosities in the examples and the comparative examples are further shown in Table 1.

TABLE 1

|  | EXAMPLE 1 | EXAMPLE 2 | EXAMPLE 3 | EXAMPLE 4 | EXAMPLE 5 | EXAMPLE 6 | EXAMPLE 7 |
| --- | --- | --- | --- | --- | --- | --- | --- |
| Thickness of film (μm) | 25 | 25 | 25 | 25 | 25 | 25 | 25 |
| Pressures applied to parts corresponding to the heat-conveying parts 1 (MPa) | 20 | 10 | 5 | 10 | 10 | 10 | 5 |
| Rates of temperature increase (° C./minute) | 3 | 3 | 3 | 1 | 3 | 5 | 5 |
| Porosities of heat-conveying parts 1 (%) | 1 | 10 | 30 | 10 | 10 | 10 | 30 |
| Porosities of flexible parts 2 (%) | 40 | 40 | 40 | 30 | 40 | 50 | 50 |
| Lengths of flexible parts 2 (mm) | 1 | 1 | 1 | 1 | 1 | 1 | 1 |

TABLE 1-continued

| | | | | | | | |
|---|---|---|---|---|---|---|---|
| Heat-radiation properties (° C.) (Measurements based on FIG. 3) | 5 | 6 | 7 | 6 | 7 | 8 | 10 |
| Evaluations | Superior | Superior | Superior | Superior | Superior | Superior | Superior |

| | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|
| Thickness of film (μm) | 25 | 25 | 25 | 25 | 25 |
| Pressures applied to parts corresponding to the heat-conveying parts 1 (MPa) | 25 | 3 | 10 | 20 | 10 |
| Rates of temperature increase (° C./minute) | 3 | 1 | 0.5 | 7 | 8 |
| Porosities of heat-conveying parts 1 (%) | 0.5 | 40 | 10 | 1 | 10 |
| Porosities of flexible parts 2 (%) | 40 | 30 | 20 | 60 | 40 |
| Lengths of flexible parts 2 (mm) | 1 | 1 | 1 | 1 | 0.5 |
| Heat-radiation properties (° C.) (Measurements based on FIG. 3) | 11 | 15 | 20 | 15 | 22 |
| Evaluations | Inferior | Inferior | Inferior | Inferior | Inferior |

COMPARATIVE EXAMPLES 1-4

Film materials were treated in the same: manner as the above examples except that conditions specified in Table 1 were adopted.

<Evaluations on Heat-radiation Properties>

Figure 3:
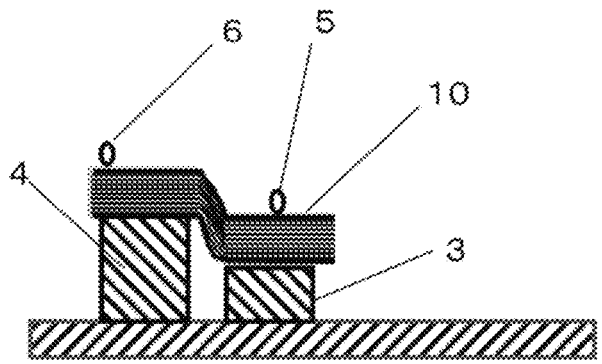
FIG. 3 is a cross-section view of a graphite material and a jig in an experiment for evaluations on heat-radiation properties.

Heat-radiation properties of graphite materials obtained in the examples and the comparative examples were evaluated by use of a simple jig. FIG. 3 shows a cross-section view of the jig used for evaluations on the effects. A component 4 that was 300 μm higher than a heat-generating component 3 was placed in the vicinity of the heat-generating component 3, and then, each of the graphite materials was pressed against these component. Temperatures of an area 5 (directly above the heat-generating component 3) and an edge area 6 of each graphite material were measured. It was considered that the smaller a difference between the temperatures was, the higher heating performance the graphite material had. Specifically, when the difference between the temperatures was 10° C. or less, heat-radiation properties of the graphite material were considered to be superior. When the difference between the temperatures was higher than 10° C., heat-radiation properties of the graphite material were considered to be inferior.

<Discussion>

(1) Porosities of Heat-conveying Parts 1

According to results of COMPARATIVE EXAMPLE 1, when porosities of heat-conveying parts 1 were arranged to be smaller (0.5%), graphite in the heat-conveying parts 1 became highly crystalline and hard, and, when the graphite material was pressed against the heat-generating component, minute cracks were caused, resulting in deterioration of heat-radiation effects.

To the contrary, when porosities of heat-conveying parts 1 were arranged to be larger (40%) in COMPARATIVE EXAMPLE 2, it was considered that a sufficient amount of neat cannot be conveyed through the heat-conveying parts 1, and this resulted in deterioration of heat-radiation properties. On the other hand, according to EXAMPLES 1-3, when the porosities were arranged to range from 1% to 30%, high heat-radiation properties were realized. Therefore, the porosities of the: heat-conveying parts 1 are preferably from 1% to 30%.

(2) Porosity of the Flexible Part 2

The graphite material in COMPARATIVE EXAMPLE 3 could not tolerate the difference in level of the components through its flexible part 2, and thus, cracks were caused therein, resulting in decreased heat-radiation properties. To the contrary, although no cracks were caused in COMPARATIVE EXAMPLE 4, it was considered that heat-radiation properties were deteriorated since heat-conveying properties of the flexible part 2 was inferior. On the other hand, according to EXAMPLES 4-6, when the porosities were adjusted so as to range from 30% to 50%, higher heat-radiation properties were realized. However, the porosity is more preferably adjusted to be larger than 30% in order to further enhance the flexibility. Hence, preferably, the porosity of the flexible part 2 is larger than 30%, and is 50% or less.

(3) Length of the Flexible Part 2

According to COMPARATIVE EXAMPLE 5, it was revealed that, when the length of the flexible part 2 is excessively small, cracks may be caused, thereby resulting in significantly deteriorated heat-radiation properties. Therefore, the length of the flexible part 2 is preferably 1 mm or more.

The above observations are summarized as follows.
(1) Porosities of heat-conveying parts 1 are preferably from 1% to 30%.

(2) Preferably, a porosity of the flexible part 2 is larger than 30%, and is 50% or less.

(3) A length of the flexible part 2 is preferably 1 mm or more.

Graphite materials produced according to the disclosure will have high heat conductivity. Therefore, the graphite materials are suitable not only as heat-conveying materials used in electronic devices (e.g., servers, server computers and desktop computers) and portable electronic devices (e.g., notebook computers, electronic dictionaries, PDAs, portable phones, PDPs and portable music players), but also as heat-conveying materials for heat equalization in vehicle batteries. Furthermore, according to the production method of the disclosure, such useful graphite materials can be produced. Therefore, the graphite materials and the production method according to the disclosure are highly industrially applicable.

What is claimed is:

1. A graphite material, comprising:
   multiple heat-conveying parts; and
   a flexible part,
   wherein the multiple heat-conveying parts have a porosity of 1% to 30%, and the flexible part has a porosity of more than 30% to 50%,
   the multiple heat-conveying parts and the flexible part are formed in a continuous manner, and basal planes of graphite in the multiple heat-conveying parts and the flexible part are continuous with each other, and
   the flexible part is placed between two of the multiple heat-conveying parts.

2. The graphite material according to claim 1, wherein the flexible part has a length of 1 mm or more.

3. The graphite material according to claim 1, wherein a content of oxygen is 3.1 at % or less, and a content of nitrogen is 4.1 at % or less.

4. The graphite material according to claim 1, wherein the graphite material comprises a multilayer structure with a gap between layers, each having a six-membered carbon ring structures of 3.73 angstroms or less.

5. The graphite material according to claim 1, wherein said graphite material includes pores, and a part of the graphite material other than the pores consists essentially of carbon.

* * * * *